US012710743B2

(12) United States Patent
Wiese et al.

(10) Patent No.: US 12,710,743 B2
(45) Date of Patent: Aug. 18, 2026

(54) SYSTEMS, DEVICES, AND METHODS FOR INTERFACING WITH INDUSTRIAL AUTOMATION EQUIPMENT

(71) Applicant: ROCKWELL AUTOMATION TECHNOLOGIES, INC., Mayfield Heights, OH (US)

(72) Inventors: Todd A. Wiese, Hubertus, WI (US); Marius G. Chis, Cambridge (CA); Patryk Woszczyna, Cracow (PL); Łukasz Górnikowski, Cracow (PL); Alfred H. Weil, Cedarburg, WI (US); Jonathan A. Mills, Mayfield Heights, OH (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 462 days.

(21) Appl. No.: 18/460,321

(22) Filed: Sep. 1, 2023

(65) Prior Publication Data

US 2025/0076849 A1 Mar. 6, 2025

(51) Int. Cl.
*G05B 19/4155* (2006.01)

(52) U.S. Cl.
CPC .................... *G05B 19/4155* (2013.01); *G05B 2219/41326* (2013.01)

(58) Field of Classification Search
None
See application file for complete search history.

(56) References Cited

U.S. PATENT DOCUMENTS 11,947,338 B1 * 4/2024 Usui .......................... G06F 30/17
2006/0026672 A1 * 2/2006 Braun .................. G05B 19/042 726/9
2009/0217200 A1 * 8/2009 Hammack .......... G05B 19/0426 715/810

OTHER PUBLICATIONS

Swarappa IN 1279/CHE/2014 A (Year: 2016).*

* cited by examiner

*Primary Examiner* — Ryan A Jarrett
(74) *Attorney, Agent, or Firm* — Quarles & Brady LLP

(57) ABSTRACT

An industrial motor drive and associated human interface module (HIM) for interfacing with the industrial motor drive to control operation of a motor in an industrial operation. The human interface module receives inputs from a human related to control parameters associated with the industrial motor drive and presents progressively narrowing lists and suggestions to assist the user in accessing and modifying control parameters associated with the industrial motor drive. Based on a modification to a control parameter, the industrial motor drive controls the operation of the motor in the industrial operation accordingly.

20 Claims, 7 Drawing Sheets

SYSTEMS, DEVICES, AND METHODS FOR INTERFACING WITH INDUSTRIAL AUTOMATION EQUIPMENT

BACKGROUND INFORMATION

The present disclosure relates generally to systems, devices, and methods for interfacing industrial automation control equipment, such as motor drives that control operation of industrial motors. In a manufacturing environment, equipment can present a variety of data to personnel in a variety of manners, many of which are inconsistent and confusing. In general, systems, devices, and methods for improving the user experience and operability of manufacturing equipment are desired in the industry.

BRIEF DESCRIPTION

One aspect of the present disclosure is an industrial motor drive for controlling operation of a motor in an industrial operation. The industrial motor drive includes a human interface module comprising a display and a keypad and processing circuitry. The processing circuitry is configured to receive a first input entered by a human via the keypad of the human interface module, the first input comprising a first alphanumeric character; cause a first list of control parameters associated with the industrial motor drive to be presented to the human via the display of the human interface module based on the first alphanumeric character, the first list of control parameters associated with the industrial motor drive comprising a first number of control parameters; receive a second input entered by the human via the keypad of the human interface module, the second input comprising a second alphanumeric character; cause a second list of control parameters associated with the industrial motor drive to be presented to the human via the display of the human interface module based on the second alphanumeric character, the second list of control parameters associated with the industrial motor drive comprising a second number of control parameters that is less than the first number of control parameters; cause a suggested control parameter associated with the industrial motor drive to be presented to the human via the display of the human interface module based on both the first alphanumeric character and the second alphanumeric character; receive a third input entered by the human via the keypad of the human interface module, the third input selecting the suggested control parameter associated with the industrial motor drive; receive a fourth input entered by the human via the keypad of the human interface module, the fourth input comprising a modification of the suggested control parameter associated with the industrial motor drive; and control operation of the motor in the industrial operation in accordance with the modification of the suggested control parameter associated with the industrial motor drive.

Another aspect of the present disclosure is a device for interfacing with an industrial motor drive that controls operation of a motor in an industrial operation. The device includes a display, a keypad, a communications interface, and processing circuitry. The processing circuitry is configured to receive a first input entered by a human via the keypad, the first input comprising a first alphanumeric character; cause a first list of control parameters associated with the industrial motor drive to be presented to the human via the display based on the first alphanumeric character, the first list of control parameters associated with the industrial motor drive comprising a first number of control parameters; receive a second input entered by the human via the keypad, the second input comprising a second alphanumeric character; cause a second list of control parameters associated with the industrial motor drive to be presented to the human via the display based on the second alphanumeric character, the second list of control parameters associated with the industrial motor drive comprising a second number of control parameters that is less than the first number of control parameters; cause a suggested control parameter associated with the industrial motor drive to be presented to the human via the display based on both the first alphanumeric character and the second alphanumeric character; receive a third input entered by the human via the keypad, the third input selecting the suggested control parameter associated with the industrial motor drive; receive a fourth input entered by the human via the keypad, the fourth input comprising a modification of the suggested control parameter associated with the industrial motor drive; and send the modification of the suggested control parameter to the industrial motor drive via the communications interface such that the industrial motor drive controls operation of the motor in the industrial operation in accordance with the modification of the suggested control parameter.

Yet another aspect of the present disclosure is a method for controlling a motor in an industrial operation. The method includes receiving a first input entered by a human via a keypad of a human interface module that interfaces with an industrial motor drive that controls operation of the motor in the industrial operation, the first input comprising a first alphanumeric character; causing a first list of control parameters associated with the industrial motor drive to be presented to the human via a display of the human interface module based on the first alphanumeric character, the first list of control parameters associated with the industrial motor drive comprising a first number of control parameters; receiving a second input entered by the human via the keypad of the human interface module, the second input comprising a second alphanumeric character; causing a second list of control parameters associated with the industrial motor drive to be presented to the human via the display of the human interface module based on the second alphanumeric character, the second list of control parameters associated with the industrial motor drive comprising a second number of control parameters that is less than the first number of control parameters; causing a suggested control parameter associated with the industrial motor drive to be presented to the human via the display of the human interface module based on both the first alphanumeric character and the second alphanumeric character; receiving a third input entered by the human via the keypad of the human interface module, the third input selecting the suggested control parameter associated with the industrial motor drive; receiving a fourth input entered by the human via the keypad of the human interface module, the fourth input comprising a modification of the suggested control parameter associated with the industrial motor drive; and controlling operation of the motor in accordance with the modification of the suggested control parameter associated with the industrial motor drive.

DETAILED DESCRIPTION

The systems, devices, and methods described herein can be used to facilitate an improved user experience in terms of operating manufacturing equipment such as industrial motor drives. As a result, improved efficiencies in terms of manufacturing operations can be achieved. In some previous approaches, equipment such as motor drives can present (e.g., via a built-in display) somewhat random codes such as "535", "1915", and "P041" to reference different control parameters associated with the equipment. Moreover, in any given manufacturing environment, several different types of equipment may be used that all communicate data in different manners.

For example, a paper manufacturing plant can include various types of motor drives that were installed at different times during the life cycle of the paper manufacturing plant, including different models of motor drives and motor drives from a variety of different manufacturers. As a result, personnel working in the paper manufacturing plant often struggle to make sense of the data being presented to them, and thereby they struggle to properly modify operation of the equipment to operate the paper manufacturing plant as efficiently as possible. However, the systems, devices, and methods described herein can be used to transition from relying on "muscle memory" for proper operation of manufacturing equipment to employing a common user interface that facilitates smoother interactions and converges the focus on the context of the desired behavior of the equipment.

Figure 1:
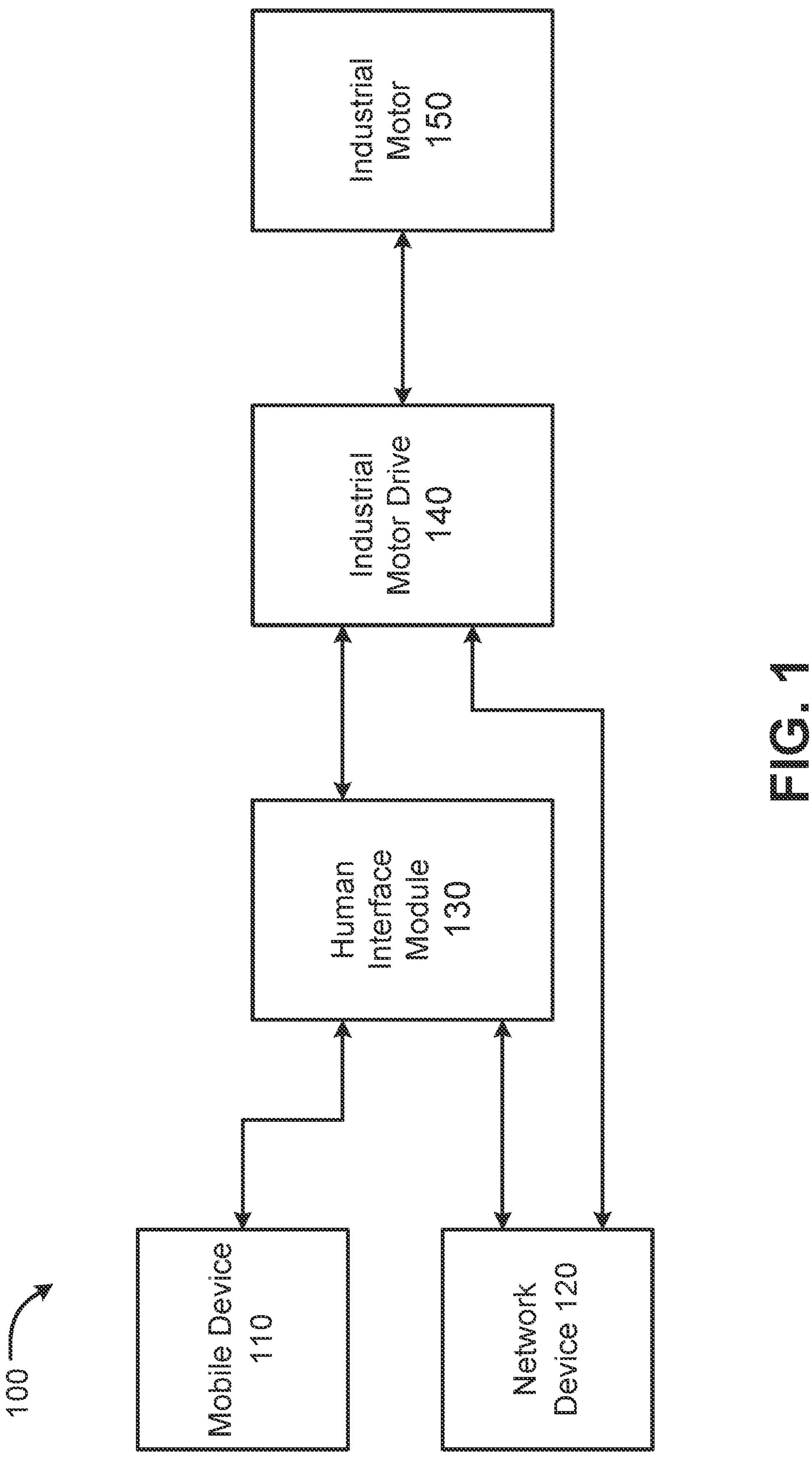
FIG. 1 is a block diagram showing example components of a system for controlling an industrial motor in an industrial operation, in accordance with some aspects of the disclosure.

Referring to FIG. 1, an example system 100 for controlling an industrial motor 150 in an industrial operation is shown, in accordance with some aspects of the disclosure. As shown, the system 100 includes a mobile device 110, a network device 120, a human interface module 130, an industrial motor drive 140, and an industrial motor 150. The elements of the system 100 as shown in FIG. 1 can be communicatively coupled in various ways, including using various types of wired and/or wireless communications protocols. Generally, the industrial motor drive 140 controls the operation of the industrial motor 150, and the human interface module 130 facilitates interaction between personnel in an industrial automation environment and the industrial motor drive 140. The system 100 can be used in a variety of different types of industrial operations, including manufacturing plants in industries such as aerospace, automotive, cement, chemical processing, food and beverage, household and personal care, life sciences, marine operations, metals processing, mining operations, oil and gas, power generation, print and publishing, pulp and paper, semiconductors, warehouse and fulfillment, and wastewater treatment, among others.

The mobile device 110 can generally be a user device associated with a person that helps operate the industrial motor 150. For example, the mobile device 110 can be associated with an operator, and engineer, or a facility stakeholder. The mobile device 110 can be any of a variety of types of mobile devices, such as a smartphone, a tablet, a wearable device, a personal computer, and other types of mobile devices. In general, the mobile device 110 can be used in the system 100 to provide advanced computing functionality relative to the human interface module 130 and/or the industrial motor drive 140. For example, as detailed below, the mobile device 110 can be used to facilitate a voice interface between the mobile device 110 and the human interface module 130 and/or the industrial motor drive 140. As a result, the user of the mobile device can provide a first voice command such as "Acceleration Rate 1" to view a specific control parameter associated with the industrial motor drive 140 and/or provide a second voice command to modify the specific control parameter associated with the industrial motor drive 140. Due to the limited computing resources that may be available on the human interface module 130 and/or the industrial motor drive 140, integration of the mobile device 110 can help facilitate this voice command functionality to improve the user experience.

The network device 120 can be any of a variety of network devices that may be in communication with the human interface module 130 and/or the industrial motor drive 140 via a network. For example, the network device 120 can be a gateway device (e.g., an edge gateway) that facilitates data collection and analysis via enterprise level systems (e.g., cloud-based systems, on-premises servers, hybrid systems). The network device 120 can also be a higher level controller used in the industrial operation, such as a programmable logic controller (PLC). The network device 120 can also be other types of devices such as a network switch. The human interface module 130 can communicate with the network device 120 in a variety of manners, including using suitable wired and/or wireless communications protocols. For example, the human interface module 130 can communicate with the network device 120 via Ethernet and/or via serial communications protocols. In some examples, the human interface module 130 can communicate with the network device 120 to access electronic data sheets associated with different types of manufacturing equipment (e.g., different models of motor drives) and/or to access an online namespace that provides a common information model enabling a common user interface that facilitates smoother interactions and converges the focus on the context of the desired behavior of the equipment. The network device 120 can interface with the human interface module 130 and/or with the industrial motor drive 140.

The human interface module 130 ("HIM") can be implemented in various ways, but generally provides an interface between personnel in an industrial automation environment and the industrial motor drive 140. In some examples (e.g., in "basic" offerings), the human interface module 130 is integral to the industrial motor drive 140 such that the human interface module 130 is part of the motor drive 140 and is not removable from the motor drive 140. In such examples, the human interface module 130 can be implemented as a screen and a keypad provided on the industrial motor drive 140. In other examples (e.g., in "standard" offerings), the human interface module 130 can be a separate electronic device used by manufacturing facility personnel to interface with the industrial motor drive 140. In such examples, the human interface module 130 can be connectable to and removable from the industrial motor drive 140 (as well as other motor drives in the manufacturing facility), for example via a Universal Serial Bus (USB) connection interface. As detailed further below, the human interface module 130 advantageously can provide descriptive search functionality to facilitate improved interaction between manufacturing facility personnel and the industrial motor drive 140.

The industrial motor drive 140 can be implemented using any suitable type of motor drive. For example, the industrial motor drive 140 can be a variable frequency drive (VFD), such as a medium voltage variable frequency drive or a low voltage variable frequency drive. The industrial motor drive 140 can also be a direct current (DC) motor drive, among other possible types of motor drives. The industrial motor drive 140 in some examples can be installed in a motor control center (MCC), can be installed in an electrical panel in a manufacturing facility, can be installed on the industrial motor 150 itself, and/or other possible configurations of the industrial motor drive 140. The industrial motor drive 140 can further include any of a variety of advanced features, such as safe torque off functionality, arc shield functionality, and/or other possible types of advanced features. The industrial motor drive 140 can be produced by a given manufacturer and associated with a given model type, both of which may differ from other motor drives installed in a given manufacturing facility. The industrial motor drive 140 can generally supply power and/or control signals to the industrial motor 150 such that the industrial motor drive 140 controls operation of the industrial motor 150. The industrial motor drive 140 can include processing circuitry and memory separate from but similar to the processor 131 and the memory 132 of the human interface module 130 as described below. For example, the processing circuitry of the industrial motor drive 140 can execute control algorithms stored in the memory of the industrial motor drive 140 to control operation of the industrial motor 150.

The industrial motor 150 likewise can be implemented using any suitable type of motor and/or combination of motors. For example, the industrial motor 150 can be an alternating current (AC) asynchronous induction motor, such as a three-phase induction motor. The industrial motor 150 can also be an alternating current (AC) synchronous motor where the rotation of the shaft is synchronized with the frequency of the current supplied to the motor. The industrial motor 150 can also be a direct current (DC) synchronous motor where the stator produces a static magnetic field while the rotor produces a rotating magnetic field. The industrial motor 150 can be used to facilitate operation of any of a variety of types of processes and equipment in a manufacturing facility depending on the application. Depending on the type (e.g., make and model) of the industrial motor 150, a variety of different control parameters and attributes can be available for modification by manufacturing facility personnel, as detailed further below. The available control parameters for the industrial motor 150 can be accessed via an electronic data sheet associated with the industrial motor 150 and/or via an online namespace that defines the available control parameters for the industrial motor 150, for example.

Figure 2:
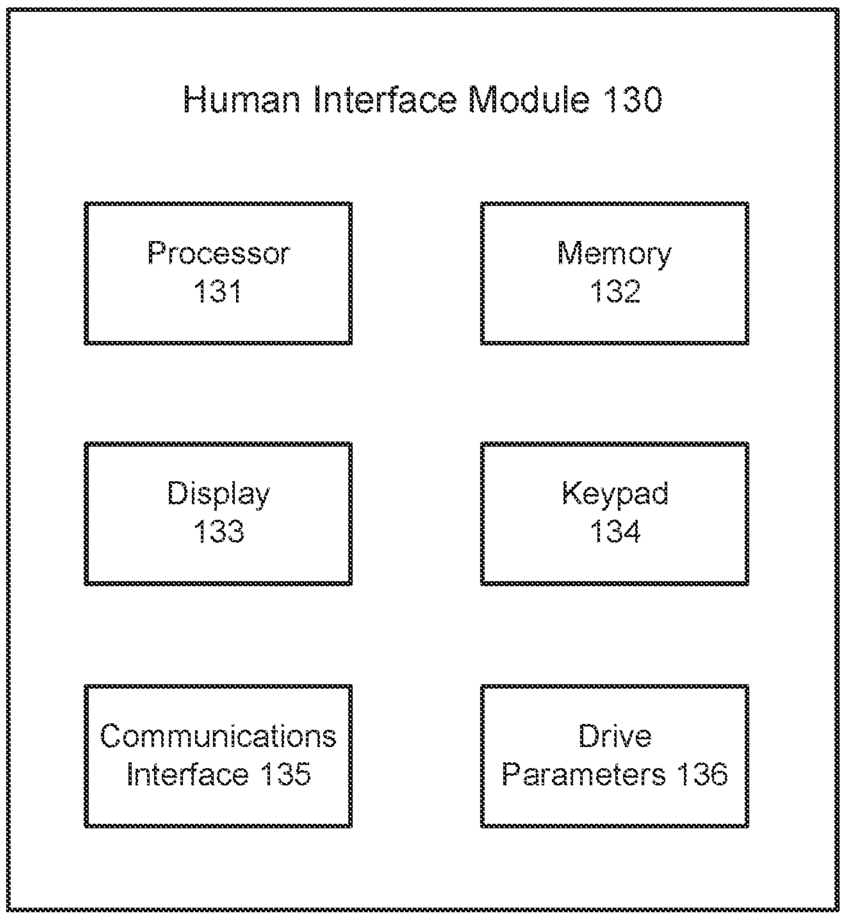
FIG. 2 is a block diagram illustrating example components of a human interface module included in the system of FIG. 1, in accordance with some aspects of the disclosure.

Referring to FIG. 2, a block diagram showing example components of the human interface module 130 is shown, in accordance with some aspects of the disclosure. As shown, the human interface module 130 can include a processor 131, a memory 132, a display 133, a keypad 134, a communications interface 135, and drive parameters 136. It is important to note that the human interface module 130 can include more or fewer components than shown in FIG. 2, and the components shown in FIG. 2 are provided as examples to illustrate the concepts of the present disclosure. As noted, the human interface module 130 can generally be used to provide an interface between personnel in an industrial automation environment and the industrial motor drive 140. The human interface module 130 can be an integral component of the industrial motor drive 140 such that the human interface module 130 is part of the industrial motor drive 140 and is not removable from the industrial motor drive 140. The human interface module 130 can also be a separate device that is connectable to and removable from the industrial motor drive 140.

The processor 131 can be implemented in the human interface module 130 using any suitable hardware processor or combination of processors, including using one or more central processing units (CPU) and/or other types of hardware processing circuitry. The processor 131 can further be implemented using any suitable number of processing cores, including single core processors, dual core processors, and other types of processor core configurations. The processor 131 can generally execute machine-readable instructions to perform various operations for the human interface module 130, for example by executing machine-readable instructions stored in one or more non-transitory computer-readable storage media. The processor 131 receive inputs from manufacturing facility personnel and cause data to be presented via the display 133 to facilitate an improved user experience, as detailed further below.

The memory 132 can include any suitable storage device or devices that can be used to store machine-readable instructions, values, etc., that can be used, for example, by the processor 131 to present content using display 133, to communicate with other computing devices, and to perform various other operations. The memory 131 can include suitable types of memory including volatile memory, non-volatile memory, storage, or a suitable combination thereof. For example, the memory 131 can include random-access memory (RAM), read-only memory (ROM), electrically erasable programmable read-only memory (EEPROM), one or more flash drives, one or more hard disks, one or more solid state drives, one or more optical drives, and the like. The memory 132 can include non-transitory computer readable storage media having instructions stored thereon for execution by processor 131 to implement various operations using the human interface module 130. The processor 131 can execute different programs stored in the memory 132 to transmit information and/or content to different computing devices and systems, receive information and/or content from different computing devices and systems, receive instructions from different computing devices and systems, and other types of operations.

The display 133 can be implemented using any suitable type and/or types of electronic displays. For example, the display 133 can be a segment display, such as a seven-segment display that uses light-emitting diodes (LEDs) and/or liquid crystals for displaying alphanumeric characters. The display 133 can also be a liquid crystal display (LCD) that uses light-emitting diodes, thin-film transistors (TFT), quantum dots (QLED), etc. The display 133 can also be organic light-emitting diode (OLED) display, an active-matrix organic light-emitting diode (AMOLED) display, a cathode-ray tube (CRT) display, a plasma display, an electroluminescent (EL) display, a touch screen display, and/or other suitable types and combinations of displays. In general, the processor 131 can execute instructions stored in the memory 132 to cause a variety of data to be displayed via the display 133. For example, the processor 131 can provide display signals to the display 133, and the display 133 can use the display signals to present information via the display 133 to manufacturing facility personnel. Using the approaches described herein, the information presented to manufacturing facility personnel via the display 133 can be more understandable and consistent across equipment than otherwise possible in some previous approaches.

Figure 5:
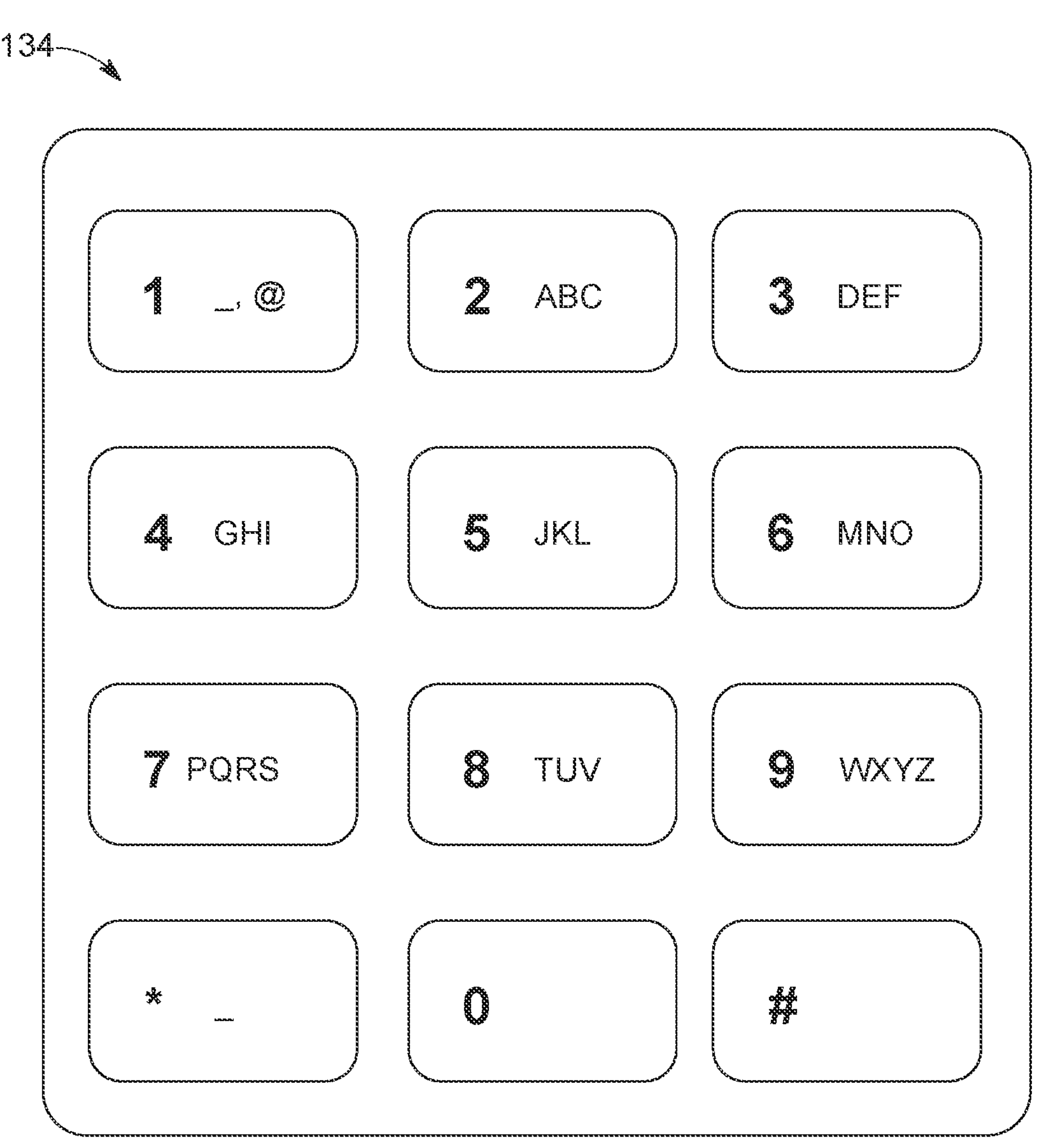
FIG. 5 is an illustration showing an example implementation of a keypad of the human interface module of the system of FIG. 1, in accordance with some aspects of the disclosure.
Figure 6:
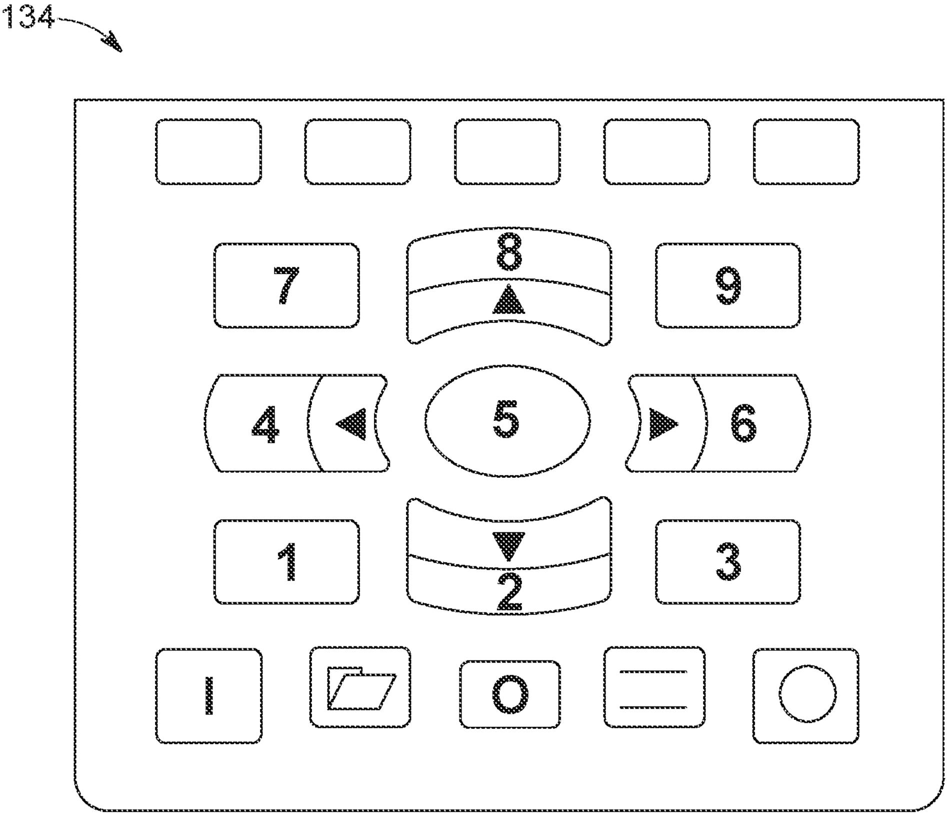
FIG. 6 is an illustration showing another example implementation of a keypad of the human interface module of the system of FIG. 1, in accordance with some aspects of the disclosure.

The keypad 134 can likewise be implemented in a variety of manners, including using various types and combinations of keys. The keys can be individual buttons (e.g., push buttons) selectable by manufacturing facility personnel to perform various operations using the human interface module 130. The keys can also be analog keys such as a rotatable dial and other types of analog keys. In some examples, the keypad 134 can include alphanumeric symbols, such as shown in FIG. 5 and FIG. 6. Moreover, in some examples, the keypad 134 can be implemented via a touch screen display, where the keys of the keypad 134 are selectable by manufacturing facility personnel via the touch screen display. In such examples, the human interface module 130 may not necessarily include physical keys (e.g., buttons, dials, etc.) that are selectable by manufacturing facility personnel. It is important to note that the human interface module 130 in many scenarios is not analogous to more advanced computing devices such as smartphones, tablets, and the like. For example, the keypad 134 can be implemented as a simple push button keypad, and the display can be implemented as a simple seven-segment display. As a result, the human interface module 130 can be provided at a far lower cost than comparable devices such as smartphones and tablets that have far more expensive processing, power, and display components when compared to the human interface module 130. Moreover, as noted, the human interface module 130 can be provided as an integral component of industrial motor drive 140, whereas devices such as smartphones and tablets do not have such capability.

The communications interface 135 can include a suitable hardware, firmware, and/or software for communicating information over any suitable types of communication networks, including local networks, external networks, the Internet, and other types of networks for accessing by the human interface module 130. For example, the communications interface 135 can include one or more transceivers, one or more communication chips and/or chip sets, one or more antennas and/or radios, and other suitable types of electronic communication components that facilitate electronic communications. For example, the communications interface 135 can include any suitable hardware, firmware, and/or software that can be used to establish a Wi-Fi connection, a Bluetooth connection, a cellular network connection, an Ethernet connection, a serial connection (e.g., a USB connection) and/or other similar types of connections.

The drive parameters 136 can include any suitable control parameters and/or attributes associated with the industrial motor drive 140 that can be viewed and/or modified by the manufacturing facility personnel via the human interface module 130. The drive parameters 136 can vary depending on the type of industrial motor drive 140 and/or the type of the industrial motor 150. For example, the drive parameters 136 can include control parameters such as acceleration rates, output frequencies, command frequencies, output currents, output voltages, bus voltages, drive status parameters (e.g., running, forward, accelerating, decelerating, safety active, etc.), fault codes, process displays, process fractions, control sources, control source statuses, digital output statuses, preset frequencies, keypad frequencies, velocity presets, and any other types of control parameters associated with the industrial motor drive 140 as will be appreciated by those skilled in the art. Each of the drive parameters 136 can have different values, such as binary values (e.g., on/off), analog values (e.g., a range of 1-100, etc.), digital values, text string values, etc. The drive parameters 136 can be associated with common industrial protocol (CIP) objects, in some examples. Generally, the values associated with the drive parameters 136 can be modified by manufacturing facility personnel via the human interface module 130 to affect operation of the industrial motor drive 140 and thereby the industrial motor 150.

Figure 3:
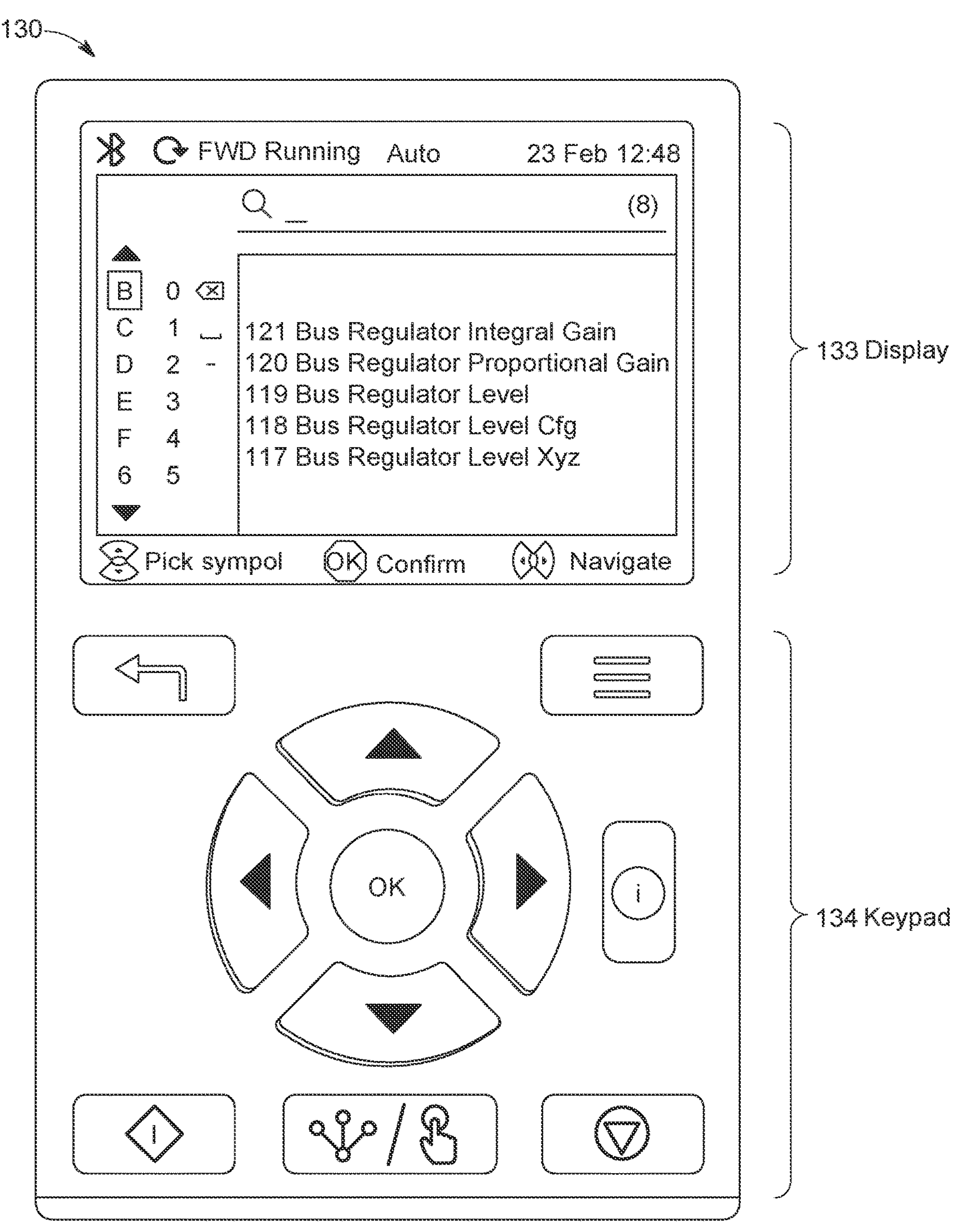
FIG. 3 is an illustration showing an example implementation of the human interface module of the system of FIG. 1, in accordance with some aspects of the disclosure.

Referring to FIG. 3, an illustration showing an example implementation of the human interface module 130 is shown, in accordance with some aspects of the disclosure. The illustration provided in FIG. 3 shows an example of the human interface module 130 implemented as a separate electronic device that is not integral to the industrial motor drive 140, but rather is connectable to and removable from the industrial motor drive 140. As shown, the keypad 134 includes a variety of keys (buttons), including directional arrow buttons, an "OK" button, an information button, a menu button, a return button, and other buttons that can be used by manufacturing facility personnel to provide inputs to the human interface module 130. Also, the display 133 is shown to present a list of the drive parameters 136 that are numbered. Specifically, the list of the drive parameters 136 includes a bus regulator integral gain parameter (121), a bus regulator proportional gain parameter (120), a bus regulator level parameter (119), and a bus regulator level configuration parameter (118).

Also, the display 133 is shown to present a selectable menu of symbols, where the user can select a string of two alphanumeric symbols, the first being a letter and the second being a number. The display 133 is also shown to include a network status indicator showing that the human interface module 130 is connected to the mobile device 110 and/or to the industrial motor drive 140 via Bluetooth. The display 133 is also shown to include a drive status indicator showing that the status of the industrial motor drive 140 is forward running. In response to receiving user inputs via the keypad 134 (and/or receiving voice commands from the mobile device 110), the human interface module 130 can progressively narrow the list of the drive parameters 136 presented via the display 133 to help the user identify a desired one of the drive parameters 136. Also, as detailed below, the human interface module 130 can present one or more suggested parameters to the user via the display 133 based on inputs received via the keypad 134 and/or from the mobile device 110. The user can confirm a selection of a specific control parameter, such as one of the suggested control parameters, using the "OK" button in this example.

Figure 4:
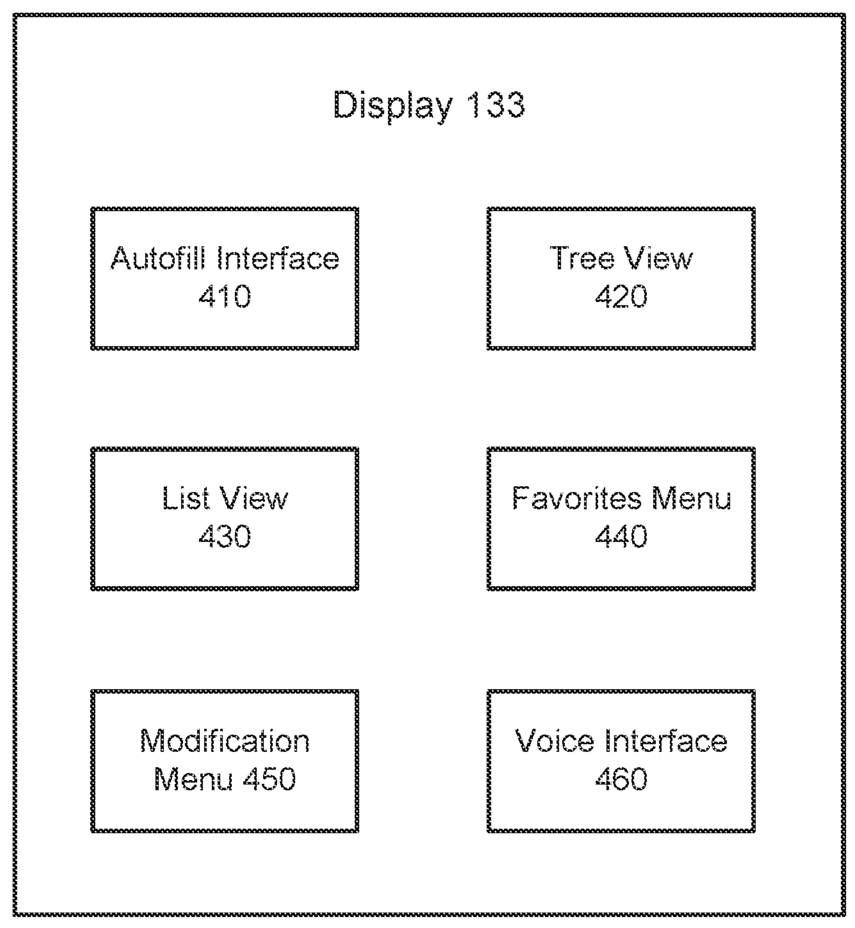
FIG. 4 is a block diagram illustrating example user interface elements of the human interface module of the system of FIG. 1, in accordance with some aspects of the disclosure.

Referring to FIG. 4, a block diagram illustrating example user interface elements that can be presented via the display 133 of the human interface module 130 are shown, in accordance with some aspects of the disclosure. As shown, the user interface elements that can be presented via the display 133 of the human interface module 130 include an autofill interface 410, a tree view 420, a list view 430, a favorites menu 440, a modification menu 450, and a voice interface 460. The user interface elements that can be presented via the display 133 of the human interface module 130 can provide an improved user experience for manufacturing facility personnel and thereby enable more efficient manufacturing and industrial automation operations in a variety of different applications.

The autofill interface 410 generally can provide autofill functionality that can be used to help manufacturing facility personnel identify the appropriate drive parameters 136 based on inputs provided by manufacturing facility personnel to the human interface module 130. For example, in response to receiving two alphanumeric characters as input from a user of the human interface module 130, the human interface module 130 can present one or more suggested control parameters to the user of the human interface module 130 via the display 133. Consider a case where the user enters the alphanumeric character "b" followed by the alphanumeric character "r" via the keypad 134. In such a case, the autofill interface 410 can include presenting one or more autofill options, such as presenting the suggested control parameters "physical brake control" and "dynamic brake" to the user via the display 133. Then, the user can simply select one of the autofill options instead of entering all of the remaining alphanumeric characters in the string. This specific functionality provided by the autofill interface 410 can provide significant time savings for the user, in addition to helping the user understand the available control parameters for a given industrial motor drive.

The tree view 420 can include a visual representation of the drive parameters 136 associated with the industrial motor drive 140 in a hierarchal manner. For example, the tree view 420 can present the drive parameters 136 associated with the industrial motor drive 140 in hierarchical tree structure that helps the user better understand the available control parameters for the industrial motor drive 140 and the relationships between the available control parameters for the industrial motor drive 140. A general drive status parameter can be presented in the tree view 420 with sub-parameters such as running, forward, accelerating, decelerating, and safety active as branches from the more general drive status parameter, for example.

The list view 430 can include a visual representation of the drive parameters 136 associated with the industrial motor drive 140 in a simple list manner. For example, the list view can present all of the available drive parameters 136 associated with the industrial motor drive 140, and then the list view 430 can progressively narrow the drive parameters 136 based on user inputs received from manufacturing facility personnel via the human interface module 130. For example, if the user enters the alphanumeric character "a" then the human interface module 130 can narrow the list view 430 such that the list view 430 only includes the drive parameters 136 that begin with the letter "a" without including any of the other available drive parameters 136. The list view 430 can help the user better understand the available control parameters for the industrial motor drive 140.

The favorites menu 440 can be implemented in a variety of ways, but generally can show the user any set of commonly used drive parameters 136 for quick accessing. For example, the user can navigate to the favorites menu 440 using the keypad 134 to view a list of all or a subset of the list of all previously selected drive parameters 136, as set by the user. Similarly, the modification menu 450 can be implemented in a variety of ways, but generally can show the user any set of previously modified drive parameters 136 for quick accessing. For example, the user can navigate to the modification menu 450 to view all of the drive parameters 136 that have previously been modified using the human interface module 130. Additionally, the voice interface 460 can be implemented in a variety of ways, but generally provides an interface via the display 133 through which the user can provide voice commands, for example via the mobile device 110.

For example, the voice interface 460 can be launched responsive to selecting a voice input option via the keypad 134. Once launched, the voice interface 460 can indicate to the user via the display 133 that the human interface module 130 is waiting to receive a voice command from the mobile device 110. Then, upon receipt of the voice command from the mobile device 110, the voice interface 460 can present an indication of the received voice command, as well as one or more suggested drive parameters 136 for selection by the user responsive to the received voice command. The favorites menu 440, the modification menu 450, and the voice interface 460 can provide advanced functionality that can result in significant time savings for the user, in addition to helping the user understand and modify the available control parameters for a given industrial motor drive.

Referring to FIG. 5, an illustration showing another example implementation of the keypad 134 of the human interface module 130 is shown, in accordance with some aspects of the disclosure. The implementation shown in FIG. 5 is a more legacy type of alphanumeric keypad similar to alphanumeric keypads included on telephones. As will be appreciated by the skilled person, without the functionality such as provided by the user interface elements of FIG. 4, the user experience as a result of using the implementation of the keypad 134 as shown in FIG. 5 can leave a great deal to be desired. Referring to FIG. 6, an illustration showing yet another example implementation of the keypad 134 of the human interface module 130 is shown, in accordance with some aspects of the disclosure. The implementation of the keypad 134 shown in FIG. 6 is similar to the implementation of the keypad 134 shown in FIG. 3, however the implementation of the keypad 134 shown in FIG. 6 includes numeric buttons that can be selected by the user. It should be noted, and will be appreciated, that various implementations of the keypad 134 are possible depending on the application. In any implementation, the functionality provided by the human interface module 130 as detailed herein can significantly improve the user experience.

Figure 7:
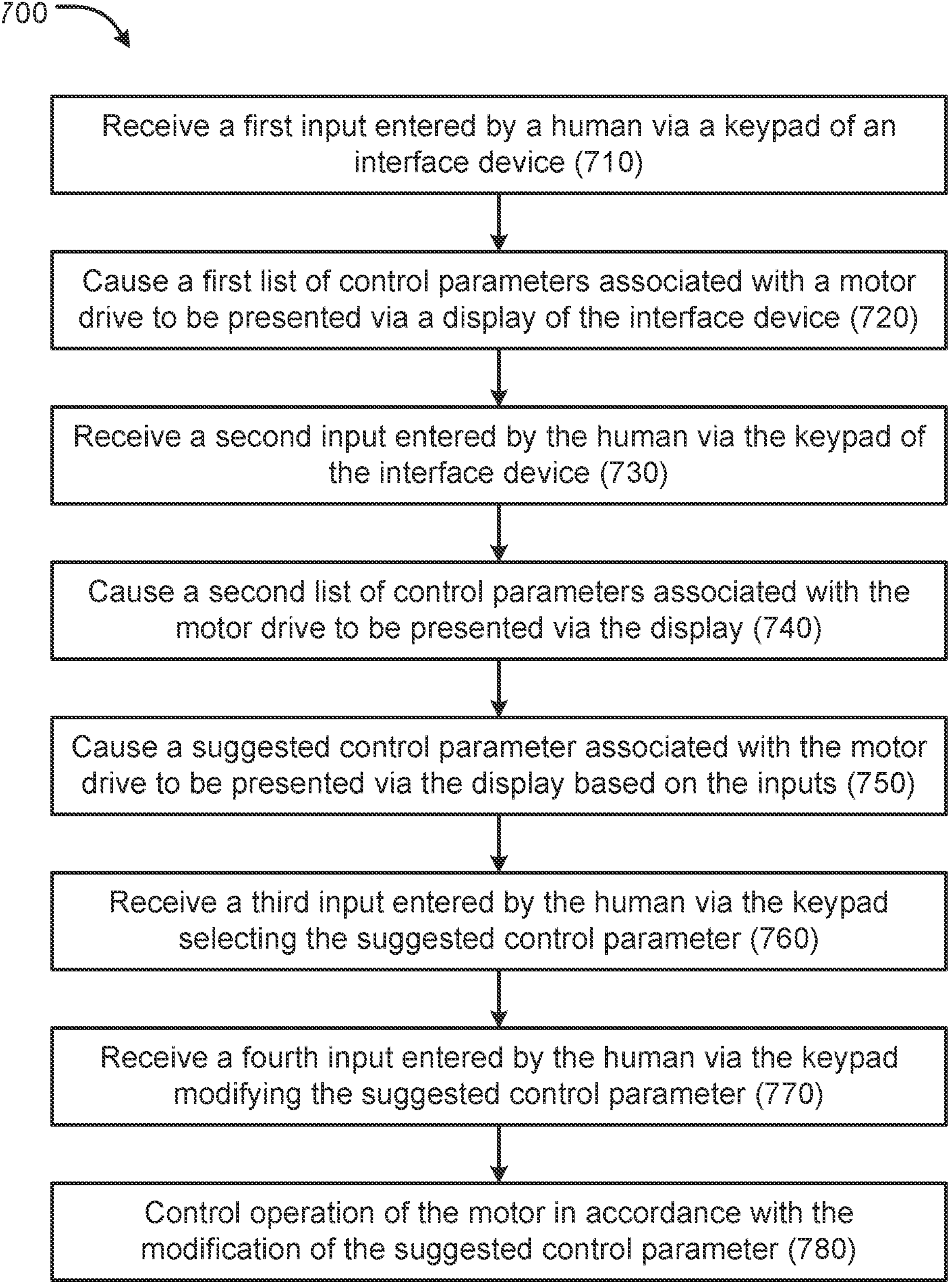
FIG. 7 is a flow diagram illustrating an example process for controlling a motor in an industrial operation, in accordance with some aspects of the disclosure.

Referring to FIG. 7, a flow diagram illustrating an example process 700 for controlling a motor in an industrial operation is shown, in accordance with some aspects of the disclosure. The process 700 can be performed by components of the system 100, including the human interface module 130. The process 700 can be used to transition from relying on "muscle memory" for proper operation of manufacturing equipment to employing a common user interface that facilitates smoother interactions and converges the focus on the context of the desired behavior of the equipment. As a result, the process 700 can be used to provide improved efficiencies in terms of manufacturing operations in various industries such as aerospace, automotive, cement, chemical processing, food and beverage, household and personal care, life sciences, marine operations, metals processing, mining operations, oil and gas, power generation, print and publishing, pulp and paper, semiconductors, warehouse and fulfillment, and wastewater treatment, and others.

At 710, the process 700 can receive a first input entered by a human via a keypad of an interface device. For example, the first input can be entered by a human via the keypad 134 of the human interface module 130. The human can be any of a variety of personnel associated with the industrial operation, such as various types of engineers, operators, facility stakeholders, and other personnel. As noted, the human interface module 130 in some implementations can be an integral component of the industrial motor drive 140 such that the human interface module 130 is part of the industrial motor drive 140 and is not removable from the industrial motor drive 140. In other implementations, the human interface module 130 can be a separate device that is connectable to and removable from the industrial motor drive 140. For example, an engineer can use the human interface module 130 to interface with multiple motor drives in a manufacturing facility by connecting the human interface module 130 to the different motor drives via a Universal Serial Bus (USB) interface. The first input entered by the human can be a first alphanumerical character indicative of a desired control parameter associated with the industrial motor drive 140 that the human desires to access and potentially modify. For example, the human may wish to view and/or modify an acceleration rate associated with the industrial motor drive 140, and the first input can be the alphanumerical character “a”.

At 720, the process 700 can cause a first list of control parameters associated with a motor drive to be presented via a display of an interface device. For example, the process 700 can access an available set of the drive parameters 136 associated with the industrial motor drive 140. Accessing the available set of the drive parameters 136 associated with the industrial motor drive 140 can include accessing an electronic data sheet associated with the industrial motor drive 140 and/or accessing a namespace associated with the industrial motor drive 140 (e.g., using an identifier for the industrial motor drive 140).

The namespace can define the available set of the drive parameters 136 by utilizing a mapping of various legacy descriptions of different drive parameters to a common information model that provides a common nomenclature for drive parameters that can be implemented across a wide variety of makes and models of industrial motor drives. Upon accessing the available set of the drive parameters 136, the process 700 can narrow the available set of the drive parameters 136 by comparing the first input to the available set of the drive parameters 136. For example, in the case where the first input is the alphanumerical character “a”, the process 700 can narrow the available set of the drive parameters 136 to only the drive parameters 136 that begin with the alphanumerical character “a” and present the first list of control parameters as only the drive parameters 136 that begin with the alphanumerical character “a” via the display 133.

At 730, the process 700 can receive a second input entered by the human via the keypad of the interface device. For example, the second input can be entered by the human via the keypad 134, and can be a second alphanumerical character indicative of the desired control parameter associated with the industrial motor drive 140 that the human desires to access and potentially modify. For example, the human may wish to view and/or modify an acceleration rate associated with the industrial motor drive 140, and the second input can be the alphanumerical character “c”. The second input can be entered in a variety of manners via the keypad 134.

At 740, the process 700 can cause a second list of control parameters associated with the motor drive to be presented via the display. The number of control parameters in the second list of control parameters can be less than a number of control parameters in the first list of control parameters. That is, the second list of control parameters can be narrower in terms of results than the first list of control parameters. For example, the process 700 can compare the second input to the first list of control parameters, and identify any/all control parameters in the first list of control parameters that match the second input. In this case, with the second input being the second alphanumerical character “c”, the process 700 can generate the second list of control parameters as only including control parameters in the first list of control parameters where the second alphanumeric character is “c”.

At 750, the process 700 can cause a suggested control parameter (or suggested control parameters) associated with the motor drive to be presented via the display based on the first input and the second input. For example, the process 700 can present one or more suggested control parameters associated with the industrial motor drive 140 (e.g., “acceleration rate 1”, “acceleration rate 2”, etc.) to the user via the display 133. In this sense, the process 700 can provide autofill suggestions for different control parameters based on the user inputs received. As another example, consider a case where the first input is the alphanumeric character “b”, and the second input is the alphanumeric character “r” entered via the keypad 134. In such a case, the process 700 at 750 can present one or more autofill options, such as presenting the suggested control parameters “physical brake control” and “dynamic brake” to the user via the display 133. This functionality can provide significant time savings for the user, in addition to helping the user understand the available control parameters for a given industrial motor drive.

At 760, the process 700 can receive a third input entered by the human via the keypad selecting the suggested control parameter. For example, the third input can include a selection of one of the suggested control parameters associated with the industrial motor drive 140 presented to the user at 750. In response to receiving the third input, the process 700 can present various information associated with the suggested control parameter to the user via the display 133, such as a current value and any other descriptive information associated with the suggested control parameter. At 770, the process 700 can receive a fourth input entered by the human via the keypad modifying the suggested control parameter. For example, the fourth input can include a changed value for the suggested control parameter entered by the user via the keypad 134. Finally, at 780, the process 700 can control operation of the motor in accordance with the modification of the suggested control parameter. For example, the human interface module 130 can cause the industrial motor drive 140 to send a control signal to the industrial motor 150 such that the industrial motor 150 operates in accordance with the modification of the suggested control parameter.

It will be appreciated that, while the steps of the process 700 are shown in a particular order in FIG. 7, the process 700 may not include all steps shown, may include additional steps, or may include the steps in a different order. For example, as noted above, the human interface module 130 can receive voice commands from the mobile device 110. In such cases, the process 700 can further include receiving a voice command from the mobile device 110, causing a second suggested control parameter to be presented via the display 133, receiving a fifth input selecting the second suggested control parameter, receiving a sixth input modifying the second suggested control parameter, and controlling operation of the motor in accordance with the modification of the second suggested control parameter. Also, one or both of the first and second inputs in the process 700 can be replaced by one or more voice commands received from the mobile device 110. Other modifications are possible consistent with the understanding of the skilled person and the details provided throughout the present disclosure.

This description uses examples to disclose the invention and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. An industrial motor drive for controlling operation of a motor in an industrial operation, the industrial motor drive comprising:

a human interface module comprising a display and a keypad; and processing circuitry configured to:

receive a first input entered by a human via the keypad of the human interface module, the first input comprising a first alphanumeric character;

cause a first list of control parameters associated with the industrial motor drive to be presented to the human via the display of the human interface module based on the first alphanumeric character, the first list of control parameters associated with the industrial motor drive comprising a first number of control parameters;

receive a second input entered by the human via the keypad of the human interface module, the second input comprising a second alphanumeric character;

cause a second list of control parameters associated with the industrial motor drive to be presented to the human via the display of the human interface module based on the second alphanumeric character, the second list of control parameters associated with the industrial motor drive comprising a second number of control parameters that is less than the first number of control parameters;

cause a suggested control parameter associated with the industrial motor drive to be presented to the human via the display of the human interface module based on both the first alphanumeric character and the second alphanumeric character;

receive a third input entered by the human via the keypad of the human interface module, the third input selecting the suggested control parameter associated with the industrial motor drive;

receive a fourth input entered by the human via the keypad of the human interface module, the fourth input comprising a modification of the suggested control parameter associated with the industrial motor drive; and control operation of the motor in the industrial operation in accordance with the modification of the suggested control parameter associated with the industrial motor drive.

2. The industrial motor drive of claim 1, wherein the processing circuitry is configured to identify the suggested control parameter based on the first alphanumeric character and the second alphanumeric character by accessing an electronic data sheet associated with the industrial motor drive and comparing the first alphanumeric character and the second alphanumeric character to an available set of control parameters associated with the industrial motor drive as defined by the electronic data sheet associated with the industrial motor drive.

3. The industrial motor drive of claim 1, wherein the processing circuitry is configured to identify the suggested control parameter based on the first alphanumeric character and the second alphanumeric character by accessing a namespace and comparing the first alphanumeric character and the second alphanumeric character to an available set of control parameters associated with the industrial motor drive as defined by the namespace.

4. The industrial motor drive of claim 1, wherein the processing circuitry is configured to cause a second suggested control parameter associated with the industrial motor drive to be presented to the human via the display of the human interface module based on both the first alphanumeric character and the second alphanumeric character.

5. The industrial motor drive of claim 1, wherein the processing circuitry is configured to cause a favorites menu associated with the industrial motor drive to be presented to the human via the display of the human interface module, the favorites menu comprising a third list of control parameters associated with the industrial motor drive that have been selected via the keypad more than a threshold number of times.

6. The industrial motor drive of claim 1, wherein the processing circuitry is configured to cause a modifications menu associated with the industrial motor drive to be presented to the human via the display of the human interface module, the modifications menu comprising a fourth list of control parameters associated with the industrial motor drive that have previously been modified via the human interface module.

7. The industrial motor drive of claim 1, wherein the processing circuitry is configured to:

receive a voice command from a mobile device associated with the human;

cause a second suggested control parameter associated with the industrial motor drive to be presented to the human via the display of the human interface module based on the voice command;

receive a fifth input entered by the human via the keypad of the human interface module, the fifth input selecting the second suggested control parameter associated with the industrial motor drive;

receive a sixth input entered by the human via the keypad of the human interface module, the sixth input comprising a modification of the second suggested control parameter associated with the industrial motor drive; and control operation of the motor in the industrial operation in accordance with the modification of the second suggested control parameter associated with the industrial motor drive.

8. A device for interfacing with an industrial motor drive that controls operation of a motor in an industrial operation, the device comprising:

a display;

a keypad;

a communications interface; and processing circuitry configured to:

receive a first input entered by a human via the keypad, the first input comprising a first alphanumeric character;

cause a first list of control parameters associated with the industrial motor drive to be presented to the human via the display based on the first alphanumeric character, the first list of control parameters associated with the industrial motor drive comprising a first number of control parameters;

receive a second input entered by the human via the keypad, the second input comprising a second alphanumeric character;

cause a second list of control parameters associated with the industrial motor drive to be presented to the human via the display based on the second alphanumeric character, the second list of control parameters associated with the industrial motor drive comprising a second number of control parameters that is less than the first number of control parameters;

cause a suggested control parameter associated with the industrial motor drive to be presented to the human via the display based on both the first alphanumeric character and the second alphanumeric character;

receive a third input entered by the human via the keypad, the third input selecting the suggested control parameter associated with the industrial motor drive;

receive a fourth input entered by the human via the keypad, the fourth input comprising a modification of the suggested control parameter associated with the industrial motor drive; and send the modification of the suggested control parameter to the industrial motor drive via the communications interface such that the industrial motor drive controls operation of the motor in the industrial operation in accordance with the modification of the suggested control parameter.

9. The device of claim 8, wherein the device for interfacing with the industrial motor drive is connectable to and removable from the industrial motor drive.

10. The device of claim 9, wherein the device for interfacing with the industrial motor drive is connectable to and removable from the industrial motor drive via a Universal Serial Bus (USB) interface.

11. The device of claim 8, wherein the processing circuitry is configured to identify the suggested control parameter based on the first alphanumeric character and the second alphanumeric character by:

accessing an electronic data sheet associated with the industrial motor drive and comparing the first alphanumeric character and the second alphanumeric character to an available set of control parameters associated with the industrial motor drive as defined by the electronic data sheet associated with the industrial motor drive; or accessing a namespace and comparing the first alphanumeric character and the second alphanumeric character to an available set of control parameters associated with the industrial motor drive as defined by the namespace.

12. The device of claim 8, wherein the processing circuitry is configured to cause a second suggested control parameter associated with the industrial motor drive to be presented to the human via the display based on both the first alphanumeric character and the second alphanumeric character.

13. The device of claim 8, wherein the processing circuitry is configured to:

receive a voice command from a mobile device associated with the human;

cause a second suggested control parameter associated with the industrial motor drive to be presented to the human based on the voice command;

receive a second voice command from the mobile device associated with the human, the second voice command comprising a modification of the second suggested control parameter associated with the industrial motor drive; and control operation of the motor in the industrial operation in accordance with the modification of the second suggested control parameter associated with the industrial motor drive.

14. The device of claim 8, wherein the device for interfacing with the industrial motor drive is integral to the industrial motor drive.

15. A method for controlling a motor in an industrial operation, the method comprising:

receiving a first input entered by a human via a keypad of a human interface module that interfaces with an industrial motor drive that controls operation of the motor in the industrial operation, the first input comprising a first alphanumeric character;

causing a first list of control parameters associated with the industrial motor drive to be presented to the human via a display of the human interface module based on the first alphanumeric character, the first list of control parameters associated with the industrial motor drive comprising a first number of control parameters;

receiving a second input entered by the human via the keypad of the human interface module, the second input comprising a second alphanumeric character;

causing a second list of control parameters associated with the industrial motor drive to be presented to the human via the display of the human interface module based on the second alphanumeric character, the second list of control parameters associated with the industrial motor drive comprising a second number of control parameters that is less than the first number of control parameters;

causing a suggested control parameter associated with the industrial motor drive to be presented to the human via the display of the human interface module based on both the first alphanumeric character and the second alphanumeric character;

receiving a third input entered by the human via the keypad of the human interface module, the third input selecting the suggested control parameter associated with the industrial motor drive;

receiving a fourth input entered by the human via the keypad of the human interface module, the fourth input comprising a modification of the suggested control parameter associated with the industrial motor drive; and controlling operation of the motor in accordance with the modification of the suggested control parameter associated with the industrial motor drive.

16. The method of claim 15, comprising identifying the suggested control parameter based on the first alphanumeric character and the second alphanumeric character by:

accessing an electronic data sheet associated with the industrial motor drive; and comparing the first alphanumeric character and the second alphanumeric character to an available set of control parameters associated with the industrial motor drive as defined by the electronic data sheet associated with the industrial motor drive.

17. The method of claim 15, comprising identifying the suggested control parameter based on the first alphanumeric character and the second alphanumeric character by accessing a namespace and comparing the first alphanumeric character and the second alphanumeric character to an available set of control parameters associated with the industrial motor drive as defined by the namespace.

18. The method of claim 15, comprising causing a second suggested control parameter associated with the industrial motor drive to be presented to the human via the display of the human interface module based on both the first alphanumeric character and the second alphanumeric character.

19. The method of claim 15, comprising:

causing a favorites menu associated with the industrial motor drive to be presented to the human via the display of the human interface module, the favorites menu comprising a third list of control parameters associated with the industrial motor drive that have been selected via the keypad more than a threshold number of times; and causing a modifications menu associated with the industrial motor drive to be presented to the human via the display of the human interface module, the modifications menu comprising a fourth list of control parameters associated with the industrial motor drive that have previously been modified via the human interface module.

20. The method of claim 15, comprising:

receiving a voice command from a mobile device associated with the human;

causing a second suggested control parameter associated with the industrial motor drive to be presented to the human based on the voice command;

receiving a second voice command from the mobile device associated with the human, the second voice command comprising a modification of the second suggested control parameter associated with the industrial motor drive; and controlling operation of the motor in the industrial operation in accordance with the modification of the second suggested control parameter associated with the industrial motor drive.

* * * * *